(12) United States Patent
Tsuji et al.

(10) Patent No.: US 10,767,022 B2
(45) Date of Patent: Sep. 8, 2020

(54) FIBER WOUND BODY, FIBER-REINFORCED RESIN MATERIAL, AND METHOD FOR MANUFACTURING FIBER WOUND BODY

(71) Applicant: KABUSHIKI KAISHA TOYOTA JIDOSHOKKI, Kariya-shi, Aichi-ken (JP)

(72) Inventors: Ryohei Tsuji, Kariya (JP); Genki Yoshikawa, Kariya (JP); Shun Kuno, Kariya (JP); Ryuta Kamiya, Kariya (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 65 days.

(21) Appl. No.: 16/316,229

(22) PCT Filed: Jun. 21, 2017

(86) PCT No.: PCT/JP2017/022788
§ 371 (c)(1),
(2) Date: Jan. 8, 2019

(87) PCT Pub. No.: WO2018/012225
PCT Pub. Date: Jan. 18, 2018

(65) Prior Publication Data
US 2019/0300668 A1      Oct. 3, 2019

(30) Foreign Application Priority Data

Jul. 15, 2016   (JP) .................. 2016-140681

(51) Int. Cl.
*B32B 1/08*     (2006.01)
*B29D 22/00*    (2006.01)
(Continued)

(52) U.S. Cl.
CPC ................. *C08J 5/24* (2013.01); *B29C 70/24* (2013.01); *B29C 70/32* (2013.01); *D04C 1/06* (2013.01); *D10B 2401/06* (2013.01)

(58) Field of Classification Search
None
See application file for complete search history.

(56) References Cited

U.S. PATENT DOCUMENTS 4,790,898 A     12/1988  Woods
8,727,174 B2 *   5/2014  Otsubo ................... F17C 13/06
                                                         156/188
(Continued)

FOREIGN PATENT DOCUMENTS

JP    2005-219328 A     8/2005
JP    2005-536580 A    12/2005
(Continued)

OTHER PUBLICATIONS

International Search Report for PCT/JP2017/022788 dated Aug. 15, 2017 [PCT/ISA/210].
(Continued)

*Primary Examiner* — Tae H Yoon
(74) *Attorney, Agent, or Firm* — Sughrue Mion, PLLC

(57) ABSTRACT

This fiber wound body has a plurality of reinforcing fiber yarns wound around a winding axis, each of the reinforcing fiber yarns having a thickness gradient portion in which the fiber content is uniform along the longitudinal direction of the yarn and the thickness gradually changes.

5 Claims, 5 Drawing Sheets

(51) Int. Cl.
  *C08J 5/24*    (2006.01)
  *B29C 70/24*   (2006.01)
  *B29C 70/32*   (2006.01)
  *D04C 1/06*    (2006.01)

(56) References Cited

U.S. PATENT DOCUMENTS

| | | |
|---|---|---|
| 9,518,342 B2 * | 12/2016 | Brockmanns ............ B29C 70/24 |
| 9,610,756 B2 * | 4/2017 | Ashton ................ B32B 37/0038 |
| 2003/0186038 A1 | 10/2003 | Ashton et al. |
| 2013/0164491 A1 | 6/2013 | Ashton et al. |
| 2013/0302571 A1 | 11/2013 | Brockmanns et al. |
| 2015/0210833 A1 * | 7/2015 | Rumeau ................ B29C 70/24 |
| | | 428/34.5 |
| 2020/0071863 A1 * | 3/2020 | Nakagawa ............... D04C 1/04 |

FOREIGN PATENT DOCUMENTS

| | | | |
|---|---|---|---|
| JP | 2014-070286 A | 4/2014 | |
| JP | 2014-508666 A | 4/2014 | |

OTHER PUBLICATIONS

International Preliminary Report on Patentability with Translation of Written Opinion of the International Searching Authority for PCT/JP2017/022788 dated Jan. 15, 2019.

Communication dated Aug. 12, 2019 by the European Patent Office in application No. 17827355.3.

* cited by examiner

FIBER WOUND BODY, FIBER-REINFORCED RESIN MATERIAL, AND METHOD FOR MANUFACTURING FIBER WOUND BODY

CROSS REFERENCE TO RELATED APPLICATIONS

This application is a National Stage of International Application No. PCT/JP2017/022788 filed Jun. 21, 2017, claiming priority based on Japanese Patent Application No. 2016-140681 filed Jul. 15, 2016.

TECHNICAL FIELD

The present invention relates to a fiber wound body used, for example, as a fiber-reinforced base of a load energy absorbing material, a fiber-reinforced resin material in which a fiber wound body is used as a fiber-reinforced base, and a method for manufacturing a fiber wound body.

BACKGROUND ART

A fiber-reinforced resin material is used as a light, strong material. When a fiber-reinforced resin material includes a compound of a fiber-reinforced base and a matrix of, for example, resin, the dynamic properties (mechanical properties) are improved as compared to the matrix itself. The fiber-reinforced base of a fiber-reinforced resin material includes, for example, a fiber wound body manufactured through filament winding (FW) or braiding (braid). The fiber wound body is manufactured by winding a number of reinforced-fiber yarns about a winding axis to have a tubular or solid structure.

A fiber-reinforced resin material is used as, for example, a load energy absorbing material. When the load energy absorbing material is used as, for example, a crash box arranged between a bumper and a frame of a vehicle body, the crash box generally needs to have a required mechanical strength to hold its position. Additionally, when an impact load exceeding the designed value is applied, the crash box needs to deform and collapse while absorbing the impact load.

The strength of the crash box is lowest in the distal portion, which is a portion that first receives an impact load, and gradually increases toward the basal portion. In a crash box of a fiber-reinforced resin material, the cross section of a reinforced fiber yarn may be increased toward the basal portion of the fiber-reinforced base to gradually vary the strength. For example, patent document 1 discloses a tubular fiber body having a transversal cross section, the shape of which changes along its length. The strength is varied by using a thick fiber yarn in a portion having a large diameter and a thin fiber yarn in a portion having a small diameter.

PRIOR ART DOCUMENT

Patent Document

Patent Document 1: Japanese National Phase Laid-Open Patent Publication No. 2014-508666

SUMMARY OF THE INVENTION

Problems that are to be Solved by the Invention

There is a demand for reduction in the weight of a fiber-reinforced resin material to reduce the mass of a vehicle that uses the fiber-reinforced resin material. However, in the structure disclosed in patent document 1, the fiber yarn used in a small diameter portion is obtained by removing a predetermined number of fibers with a removal device, and the fiber yarn used in a large diameter portion, which needs to be strong, is obtained by attaching a predetermined number of fibers with an attachment device. Thus, the mass of fibers in each section is uniform. In other words, the mass of fibers in the fiber-reinforced resin material can be changed in only a stepped manner in accordance with each section. Thus, taking account of the required strength, each section may have a mass of unnecessary fibers. The same problem occurs when a tubular fiber arranged body has a transversal cross section, the shape of which is uniform along its length, and the cross section of a reinforced fiber yarn is increased toward the basal portion of a fiber-reinforced base.

It is an object of the present invention to provide a fiber wound body, a fiber-reinforced resin material, and a method for manufacturing a fiber wound body that achieve weight reduction.

Means for Solving the Problem

To achieve the above object, a fiber wound body includes reinforced fiber yarns wound about a winding axis. Each of the reinforced fiber yarns includes a gradual cross-section change portion. The gradual cross-section change portion has a fiber content rate that is constant in a longitudinal direction of the yarn and has a cross section that gradually changes.

To achieve the above object, a fiber-reinforced resin material includes the fiber wound body described above and a matrix resin. The fiber wound body is a fiber-reinforced base.

To achieve the above object, a method for manufacturing a fiber wound body includes elongating each of reinforced fiber yarns having a cross section constant in a longitudinal direction of the yarn in one direction with a drafting device including roller groups; when elongating the reinforced fiber yarns in one direction, forming a gradual cross-section change portion having a fiber content rate that is constant in the longitudinal direction of the yarn and having a cross section that gradually changes by continuously varying a drafting rate of the drafting device to continuously change the cross section of the reinforced fiber yarns in the one direction; and obtaining a fiber wound body by winding the reinforced fiber yarns including the gradual cross-section change portions about a winding axis.

EMBODIMENTS OF THE INVENTION

First Embodiment

A first embodiment of a fiber wound body, a fiber-reinforced resin material, and a method for manufacturing a fiber wound body will now be described with reference to FIGS. 1 to 5.

Figure 1:
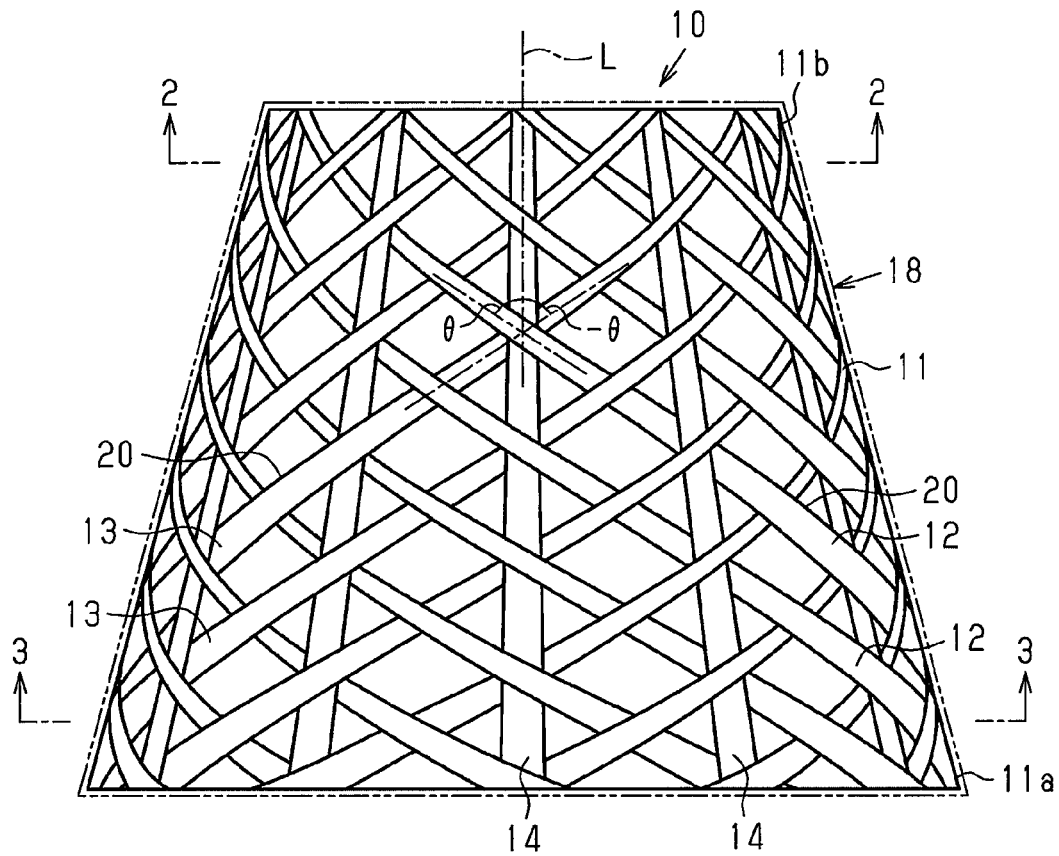
FIG. 1 is a front view of a first embodiment of a load energy absorbing material.

FIG. 1 shows a load energy absorbing material 10 used as a fiber-reinforced resin material. The load energy absorbing material 10 includes a tubular braid 11, which is a fiber wound body used as a fiber-reinforced base, and a matrix resin.

The tubular braid 11 is shaped as a tubular cone in a structure braided by first reinforced fiber yarns 12, second reinforced fiber yarns 13, and third reinforced fiber yarns 14. The tubular braid 11 has an axial end including a basal portion 11a and the other axial end including a distal portion 11b. In the tubular braid 11, a direction in which a winding axis L extends refers to the axial direction.

The first reinforced fiber yarns 12 are arranged parallel to each other. The second reinforced fiber yarns 13 are arranged parallel to each other and intersect with the first reinforced fiber yarns 12. The third reinforced fiber yarns 14 are arranged parallel to each other and intersect with the first reinforced fiber yarns 12 and the second reinforced fiber yarns 13. An angle at which the third reinforced fiber yarns 14 intersect with the first reinforced fiber yarns 12 is equal to an angle at which the third reinforced fiber yarns 14 intersect with the second reinforced fiber yarns 13. The third reinforced fiber yarns 14 are arranged in a generatrix direction of the cone. Thus, the tubular braid 11 has a structure in which the first reinforced fiber yarns 12 and the second reinforced fiber yarns 13 are wound around the third reinforced fiber yarns 14. The first reinforced fiber yarns 12 and the second reinforced fiber yarns 13 are wound about the winding axis L.

The first reinforced fiber yarns 12 and the second reinforced fiber yarns 13 are configured to be oblique yarn lines in the tubular braid 11. The third reinforced fiber yarns 14 are configured to be axial yarn lines in the tubular braid 11. The first reinforced fiber yarns 12 are arranged to intersect with the winding axis L of the tubular braid 11 at an oblique angle θ. The second reinforced fiber yarns 13 are arranged to intersect with the winding axis L of the tubular braid 11 at an angle −θ, which is opposite to the oblique angle θ. The oblique angle θ is set in accordance with, for example, the shape of the tubular braid 11 and the required strength.

The first to third reinforced fiber yarns 12 to 14 are formed by spinning non-continuous fibers. The first to third reinforced fiber yarns 12 to 14 are formed of carbon fibers, but may be formed of glass fibers or resin fibers. The first to third reinforced fiber yarns 12 to 14 include gradual cross-section change portions 20, each of which has a cross section that continuously decreases from the basal portion 11a toward the distal portion 11b of the tubular braid 11. In the present embodiment, the cross section of the reinforced fiber yarns 12 to 14 (gradual cross-section change portions 20) refers to the lateral dimension and the transverse dimension of a low-profile cross section of the reinforced fiber yarns 12 to 14. That is, continuous change in the cross section of a gradual cross-section change portion 20 refers to continuous change in both the lateral dimension and the transverse dimension of the gradual cross-section change portion 20. Alternatively, one of the lateral dimension and the transverse dimension of the gradual cross-section change portion 20 may be fixed while the other dimension continuously changes.

Figure 2:
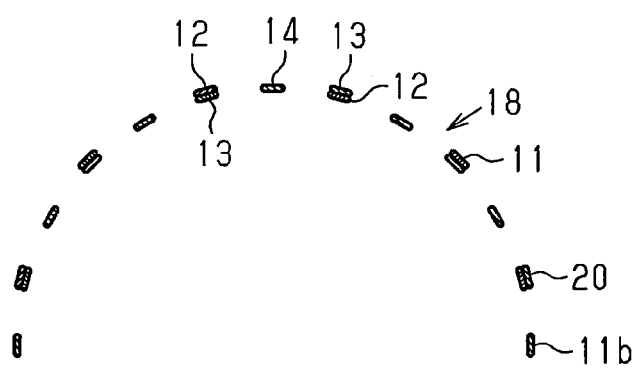
FIG. 2 is a cross-sectional view of a tubular braid taken along line 2-2 in FIG. 1.
Figure 3:
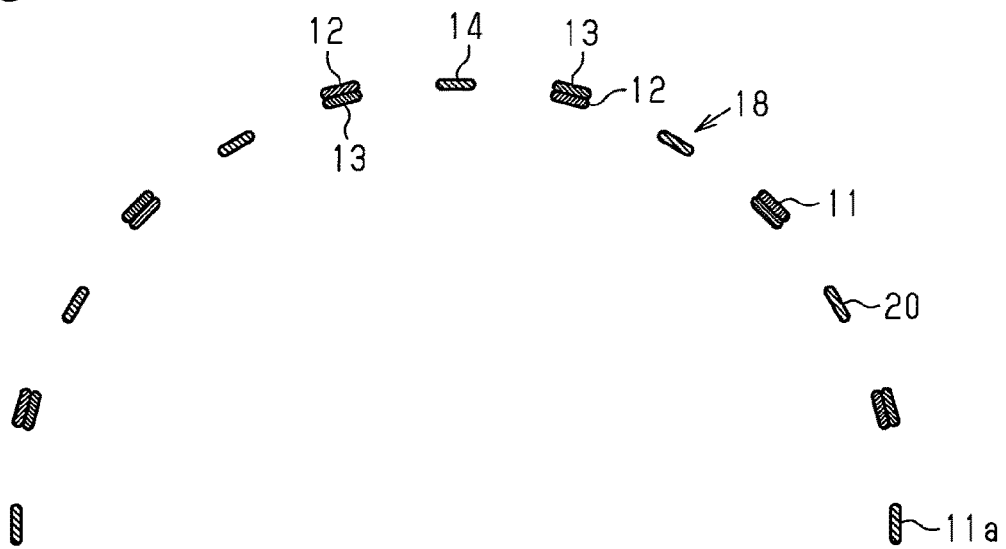
FIG. 3 is a cross-sectional view of a tubular braid taken along line 3-3 in FIG. 1.

As shown in FIGS. 2 and 3, the tubular braid 11 includes a gradual thickness change portion 18. When the dimension of the tubular braid 11 in the radial direction refers to the thickness, the thickness of the gradual thickness change portion 18 increases toward the basal portion 11a. That is, the thickness of the gradual thickness change portion 18 decreases toward the distal portion 11b. Thus, the thickness of the tubular braid 11 gradually decreases from the basal portion 11a toward the distal portion 11b along the winding axis L. Each of the reinforced fiber yarns 12 to 14 has a fiber content rate that is the same at any position in a longitudinal direction of the yarn. Accordingly, the tubular braid 11 has a fiber content rate that is the same at any position in the axial direction. The fiber content rate of each of the reinforced fiber yarns 12 to 14 refers to the proportion of fibers occupied in the total cross-sectional area of the respective reinforced fiber yarns 12 to 14.

The tubular braid 11 having the configuration described above is manufactured using a braider (braiding device) including a drafting device.

Figure 4:
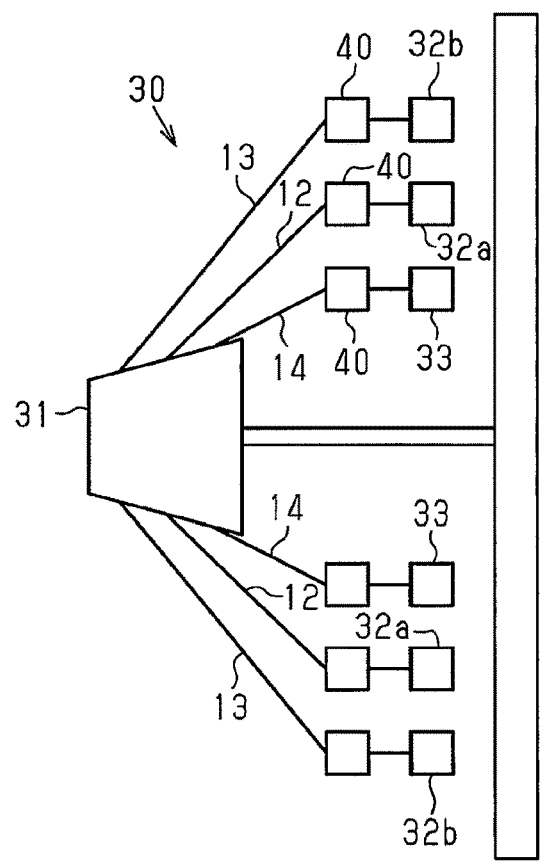
FIG. 4 is a schematic diagram showing a braider.

As shown in FIG. 4, a braider 30 includes first oblique yarn feeders 32a and second oblique yarn feeders 32b. The first reinforced fiber yarns 12 are fed out of the first oblique yarn feeders 32a to a circumferential surface of a mandrel 31 at a predetermined angle with respect to the axis of the mandrel 31. The second reinforced fiber yarns 13 are fed out of the second oblique yarn feeders 32b to the circumferential surface of the mandrel 31 at a predetermined angle with respect to the axis of the mandrel 31. The first reinforced fiber yarns 12 fed out of the first oblique yarn feeders 32a are provided to the mandrel 31 at an angle +θ. The second reinforced fiber yarns 13 fed out of the second oblique yarn feeders 32b are provided to the mandrel 31 at an angle −θ. In the present embodiment, the predetermined angle is 45°. The oblique yarn feeders 32a and 32b feed out the reinforced fiber yarns 12 and 13 that do not include the gradual cross-section change portions 20 and thus have a constant cross section.

The braider 30 includes axial yarn feeders 33. The third reinforced fiber yarns 14 are fed out of the axial yarn feeders 33 and arranged in the axial direction of the mandrel 31. The axial yarn feeders 33 feed out the third reinforced fiber yarns 14 that do not have the gradual cross-section change portions 20 and thus have a constant cross section.

The braider 30 includes drafting devices 40. The drafting devices 40 are arranged at a downstream side of the feeders 32a, 32b, and 33 in a direction in which the oblique yarn feeders 32a and 32b and the axial yarn feeders 33 feed the reinforced fiber yarns 12 to 14. The drafting devices 40 respectively receive the reinforced fiber yarns 12 to 14 from the feeders 32a, 32b, and 33 and elongate the reinforced fiber yarns 12 to 14.

Figure 5:
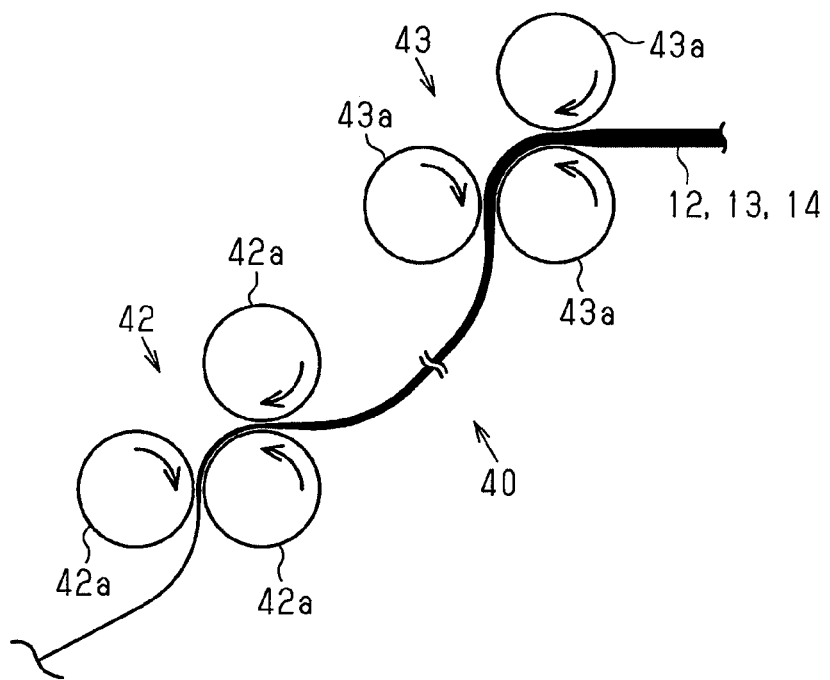
FIG. 5 is a schematic diagram showing a drafting device.

As shown in FIG. 5, each of the drafting devices 40 includes a front roller group 42 and a back roller group 43. The front roller group 42 includes rollers 42a. The back roller group 43 includes rollers 43a. When the reinforced fiber yarns 12 to 14 are fed out of the oblique yarn feeders 32a and 32b and the axial yarn feeders 33 to the mandrel 31, while the circumferential speed of the back roller group 43 is kept constant, the circumferential speed of the front roller group 42 is continuously increased. Consequently, the cross section of the reinforced fiber yarns 12 to 14 that have passed through the front roller group 42 gradually decreases from the cross section at a point in time when the reinforced fiber yarns 12 to 14 passed through the back roller group 43.

The reinforced fiber yarns 12 to 14 are elongated so that the cross section of the reinforced fiber yarns 12 to 14 gradually decreases toward the downstream side in the feeding direction. As a result, each of the reinforced fiber yarns 12 to 14 has a cross section that gradually decreases and includes the gradual cross-section change portion 20. Additionally, the drafting rate is lower toward the upstream side in the feeding direction. Thus, the cross section of the reinforced fiber yarns 12 to 14 remains close to the cross section of the reinforced fiber yarns 12 to 14 that have not been elongated.

When the reinforced fiber yarns 12 to 14 are fed out of the drafting devices 40 to the mandrel 31, the tubular braid 11 is obtained. The obtained tubular braid 11 is impregnated with a thermosetting resin and cured to manufacture the load energy absorbing material 10. The impregnation and curing of the resin is performed through resin transfer molding (RTM) but may be performed through a process other than resin transfer molding (RTM).

As shown in FIG. 1, in the load energy absorbing material 10 in which the tubular braid 11 is used as the fiber-reinforced base, as described above, the thickness of the tubular braid 11 gradually increases from the distal portion 11b toward the basal portion 11a in the axial direction because of the gradual thickness change portion 18. The strength of the load energy absorbing material 10 is lowest in the distal portion, which corresponds to the distal portion 11b of the tubular braid 11. The strength of the load energy absorbing material 10 gradually increases from the distal portion 11b toward the basal portion 11a in the axial direction of the tubular braid 11.

The embodiment has the operation and advantages described below.

(1) In the tubular braid 11 of the load energy absorbing material 10, the first to third reinforced fiber yarns 12 to 14 include the gradual cross-section change portions 20. The gradual cross-section change portions 20 gradually change the cross section of the first to third reinforced fiber yarns 12 to 14 so that the strength of the tubular braid 11 gradually varies along the winding axis L. The tubular braid 11 includes the gradual thickness change portion 18, the thickness of which gradually changes in accordance with the gradual cross-section change portions 20. The thickness of the gradual thickness change portion 18 of the tubular braid 11 gradually changes in accordance with changes in the cross section of the first to third reinforced fiber yarns 12 to 14. This allows the gradual thickness change portion 18 to have the same fiber content rate at any position in the axial direction of the tubular braid 11. Thus, even when the thickness of the tubular braid 11 is changed, the weight reduction may be achieved as compared to, for example, when further reinforced fibers are added to the first to third reinforced fiber yarns 12 to 14 to increase the thickness or reinforced fibers are removed from the first to third reinforced fiber yarns 12 to 14 to decrease the thickness so that the strength of the tubular braid 11 varies.

(2) For example, when first to third reinforced fiber yarns have a uniform cross section and are used to manufacture a tubular braid, the oblique angle θ of the first and second reinforced fiber yarns needs to be controlled to vary the strength in the axial direction of the tubular braid. Such control is complex. Additionally, the design of the oblique angle θ will be complex to achieve the weight reduction. In this regard, in the tubular braid 11 of the embodiment, the thickness is smoothly and gradually changed in accordance with the gradual cross-section change portions 20. More specifically, the cross section of the first to third reinforced fiber yarns 12 to 14 is increased on a thick portion of the tubular braid 11, and the cross section of the first to third reinforced fiber yarns 12 to 14 is decreased on a thin portion of the tubular braid 11. This allows the strength of the tubular braid 11 to vary in the axial direction without changing the oblique angle θ of the first and second reinforced fiber yarns 12 and 13. The tubular braid 11 is manufactured without a complex control of the oblique angle θ.

(3) The cross section of the gradual cross-section change portions 20 of the first to third reinforced fiber yarns 12 to 14 is smoothly changed and is not abruptly changed such as in a stepped manner. Accordingly, the thickness of the tubular braid 11 is smoothly changed, and the strength is smoothly changed.

(4) In the tubular braid 11, the oblique angle θ of the first and second reinforced fiber yarns 12 and 13 is constant from the basal portion 11a to the distal portion 11b. For example, when the tubular braid 11 is manufactured so that first to third reinforced fiber yarns have a uniform cross section and have a constant oblique angle at the distal portion and the basal portion of the tubular braid, the length of the first and second reinforced fiber yarns extending around the tubular braid once increases at positions toward the basal portion of the tubular braid where the diameter increases. This increases a gap between adjacent ones of the first reinforced fiber yarns and a gap between adjacent ones of the second reinforced fiber yarns. Consequently, the strength of the load energy absorbing material is lowered toward the basal portion of the tubular braid. In this case, to maintain the strength of the basal portion, the oblique angle of the first reinforced fiber yarns and the second reinforced fiber yarns needs to be gradually changed toward the basal portion so that the gap of adjacent ones of the first reinforced fiber yarns and the gap of adjacent ones of the second reinforced fiber yarns are maintained. In this regard, the first and second reinforced fiber yarns 12 and 13 include the gradual cross-section change portions 20. The gap between adjacent ones of the first reinforced fiber yarns 12 and the gap between adjacent ones of the second reinforced fiber yarns 13 will not be excessively increased even at the basal portion 11a having a large diameter, and the strength will not be lowered. This eliminates the need for a change in the oblique angle of the first and second reinforced fiber yarns 12 and 13 and allows the tubular braid 11 to be easily manufactured without lowering the strength.

(5) In the tubular braid 11, each of the first to third reinforced fiber yarns 12 to 14 includes the gradual cross-section change portion 20. The strength is easily adjusted at any position in the axial direction of the tubular braid 11 by controlling the cross section of each of the first to third reinforced fiber yarns 12 to 14.

(6) The braider 30 manufacturing the tubular braid 11 includes the drafting devices 40 at the downstream side of the oblique yarn feeders 32a and 32b and the axial yarn feeders 33 in the feeding direction. The cross section is gradually changed with the drafting devices 40 by controlling the drafting rate of each of the reinforced fiber yarns 12 to 14 fed out of the oblique yarn feeders 32a and 32b and the axial yarn feeders 33. When the drafting rate is controlled by the drafting devices 40, the tubular braid 11 having a target thickness is manufactured.

Second Embodiment

A second embodiment of a fiber wound body, a fiber-reinforced resin material, and a method for manufacturing a fiber wound body will now be described with reference to FIGS. 6 to 9. In the second embodiment, the same reference characters are given to those elements that are the same as the corresponding elements of the first embodiment. Such elements will not be described in detail.

Figure 6:
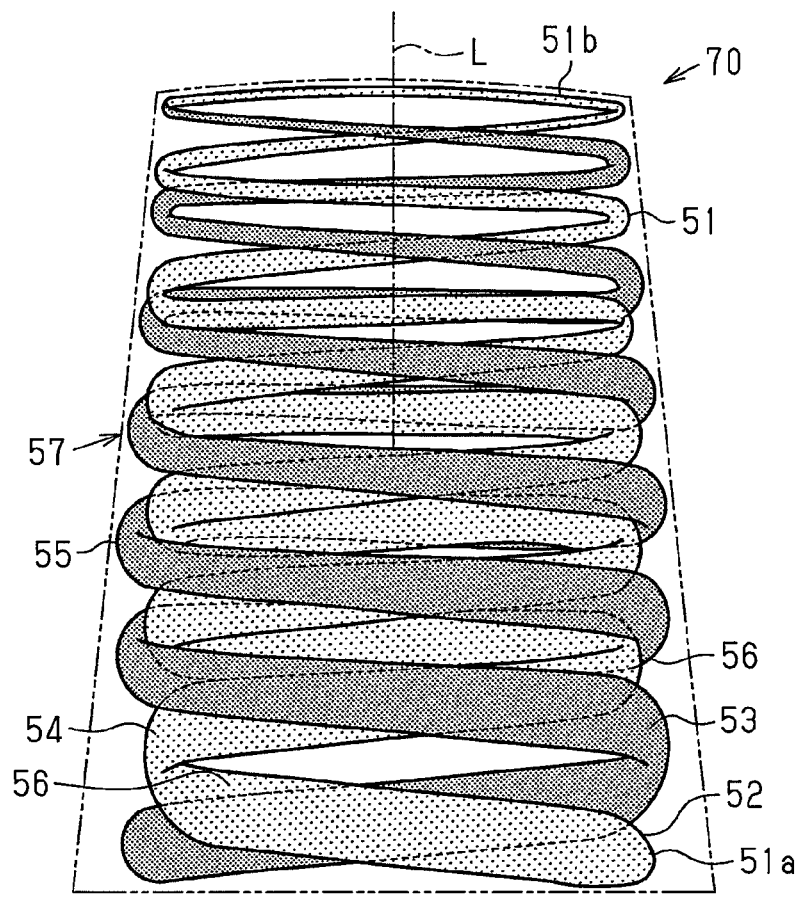
FIG. 6 is a front view showing a second embodiment of a load energy absorbing material.

As shown in FIG. 6, a second embodiment of a load energy absorbing material 70 used as a fiber-reinforced resin material includes a fiber wound body 51, which is used as the fiber-reinforced base, and a matrix resin.

The fiber wound body 51 is tubular. The fiber wound body 51 has a structure in which a first fiber layer 54, which is an inner layer formed by a first reinforced fiber yarn 52, and a second fiber layer 55, which is an outer layer formed by a second reinforced fiber yarn 53 at a radially outer side of the first fiber layer 54, are stacked on each other. In the fiber wound body 51, a direction in which the winding axis L extends refers to the axial direction. The fiber wound body 51 has an axial end including a basal portion 51a and the other axial end including a distal portion 51b.

The first reinforced fiber yarn 52 is wound to intersect with the winding axis L of the fiber wound body 51 at an angle ±θ. The second reinforced fiber yarn 53 is wound to intersect with the winding axis L of the fiber wound body 51 at the angle ±θ. The intersecting angle θ of each of the reinforced fiber yarns 52 and 53 is set in accordance with, for example, the shape of the fiber wound body 51 and the required strength.

The first and second reinforced fiber yarns 52 and 53 are obtained by spinning non-continuous fibers. The first and second reinforced fiber yarns 52 and 53 are formed by carbon fibers but may be formed of glass fibers or resin fibers. The first reinforced fiber yarn 52 and the second reinforced fiber yarn 53 each include a gradual cross-section change portion 56 having a cross section that continuously decreases from the basal portion 51a toward the distal portion 51b of the fiber wound body 51.

Figure 7:
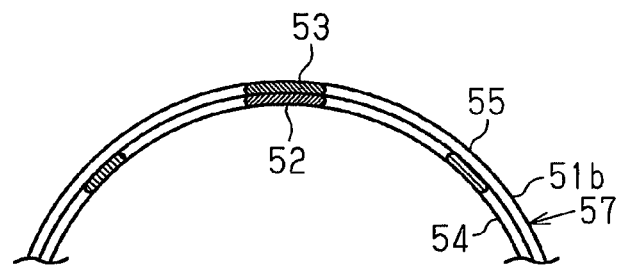
FIG. 7 is a cross-sectional view showing a distal portion of a fiber wound body.
Figure 8:
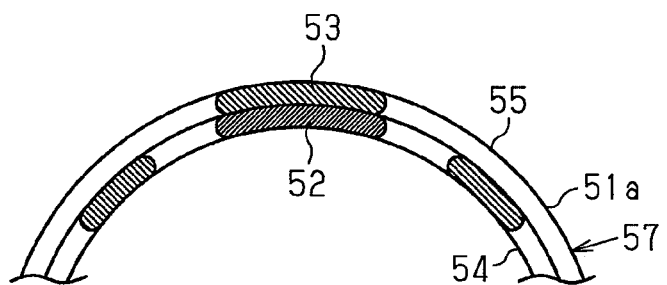
FIG. 8 is a cross-sectional view showing a basal portion of a fiber wound body.

As shown in FIGS. 7 and 8, the fiber wound body 51 includes a gradual thickness change portion 57. The thickness of the gradual thickness change portion 57 increases toward the basal portion 51a and decreases toward the distal portion 51b. Thus, the thickness of the fiber wound body 51 is gradually decreased by the gradual thickness change portion 57 from the basal portion 51a toward the distal portion 51b along the winding axis L. The cross section of the gradual cross-section change portion 56 regularly decreases from a thick part toward a thin part of the gradual thickness change portion 57. Even when the thickness of the fiber wound body 51 is changed, the gradual thickness change portion 57 is formed by the gradual cross-section change portions 56 of the reinforced fiber yarns 52 and 53. Thus, each of the reinforced fiber yarns 52 and 53 has a fiber content rate that is the same at any position in a longitudinal direction of the yarn. Accordingly, the fiber wound body 51 has a fiber content rate that is the same at any position in the axial direction.

The fiber wound body 51 is tapered so that the outer diameter gradually decreases from the basal portion 51a toward the distal portion 51b. The inner diameter of the fiber wound body 51 is constant from the basal portion 51a toward the distal portion 51b.

Figure 9:
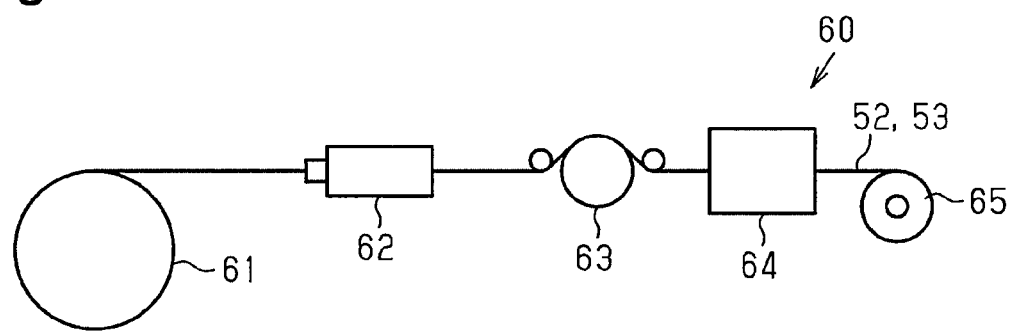
FIG. 9 is a schematic diagram of a filament winding device.

The fiber wound body 51 is manufactured through filament winding. As shown in FIG. 9, a filament winding device 60 manufacturing the fiber wound body 51 includes a mandrel 61, a feeding head 62, a resin bath 63, a drafting device 64, and a bobbin 65. In the same manner as the first embodiment, the drafting device 64 includes a front roller and a back roller. The reinforced fiber yarns 52 and 53 that do not include the gradual cross-section change portion 56 and thus have a constant cross section are wound around the bobbin 65.

When fed out of the bobbin 65, the reinforced fiber yarns 52 and 53 are elongated by the drafting device 64. As the reinforced fiber yarns 52 and 53 move from the bobbin 65 toward the downstream side in the feeding direction, the reinforced fiber yarns 52 and 53 are elongated so that the cross section gradually decreases. When the cross section of each of the reinforced fiber yarns 52 and 53 is gradually decreased, the gradual cross-section change portion 56 is manufactured.

The reinforced fiber yarns 52 and 53 including the gradual cross-section change portions 56 are impregnated with a resin in the resin bath 63 and then directed to the feeding head 62. The reinforced fiber yarns 52 and 53 impregnated with the resin in the resin bath 63 are wound around a mandrel 61 via the feeding head 62. At this time, angles at which the reinforced fiber yarns 52 and 53 are wound around the mandrel 61 are adjusted.

The beginning of winding in the fiber wound body 51 corresponds to the basal portion 51a. As the reinforced fiber yarns 52 and 53 are elongated by the drafting device 64 so that the cross section gradually decreases, the reinforced fiber yarns 52 and 53 are wound around the mandrel 61. When the winding is completed, the gradual cross-section change portion 56 is manufactured. The drafting rate of the reinforced fiber yarns 52 and 53 is lower toward the beginning of winding. Thus, the cross section of the reinforced fiber yarns 52 and 53 is closer to the cross section of the reinforced fiber yarns 52 and 53 that have not been elongated at positions toward the beginning of winding.

As shown in FIG. 6, in the load energy absorbing material 70 in which the fiber wound body 51 is used as the fiber-reinforced base, as described above, the thickness of the fiber wound body 51 gradually increases from the distal portion 51b toward the basal portion 51a in the axial direction because of the gradual thickness change portion 57. Thus, the strength of the load energy absorbing material 70 is lowest in a distal portion corresponding to the distal portion 51b of the fiber wound body 51. The strength of the load energy absorbing material 70 gradually increases from the distal portion 51b toward the basal portion 51a in the axial direction of the fiber wound body 51.

The second embodiment has the advantages described below in addition to the advantages of the first embodiment.

(7) In the fiber wound body 51 of the load energy absorbing material 70, the first and second reinforced fiber yarns 52 and 53 include the gradual cross-section change portions 56. The fiber wound body 51 includes the gradual thickness change portion 57, the thickness of which gradually changes in accordance with the gradual cross-section change portions 56. The thickness of the gradual thickness change portion 57 of the fiber wound body 51 gradually changes in accordance with changes in the cross section of the first and second reinforced fiber yarns 52 and 53. This allows the fiber content rate to be the same at any position in the axial direction of the fiber wound body 51. Thus, even when the thickness of the fiber wound body 51 is changed to vary the strength of the fiber wound body 51, weight reduction may be achieved.

(8) The fiber wound body 51 is manufactured through filament winding. For example, when a yarn having a uniform cross section is used in filament winding to manufacture a fiber wound body, a fiber layer for reinforcement needs to be added to a portion that needs higher strength to vary the strength of the fiber wound body 51 in the axial direction. In this case, the weight will be increased by an amount corresponding to the added fiber layer for reinforcement. In this regard, the cross section of each of the reinforced fiber yarns 52 and 53 is increased toward the basal portion 51*a* of the fiber wound body 51. This increases the strength of the basal portion 51*a* and eliminates the need for reinforcement of the basal portion 51*a*. Thus, the load energy absorbing material 70 is easily manufactured without increasing the weight.

(9) In the fiber wound body 51, two kinds of the reinforced fiber yarns 52 and 53 each include the gradual cross-section change portion 56. Thus, the strength of the fiber wound body 51 is easily adjusted at any position in the axial direction by controlling the cross section of the first and second reinforced fiber yarns 52 and 53.

(10) The filament winding device 60 manufacturing the fiber wound body 51 includes the drafting device 64 at the downstream side of the feeding head 62 in the feeding direction. The cross section of each of the reinforced fiber yarns 52 and 53 fed out of the feeding head 62 is gradually changed with the drafting device 64. The fiber wound body 51 may be manufactured while changing the cross section of each of the reinforced fiber yarns 52 and 53. Additionally, before the reinforced fiber yarns 52 and 53 are impregnated in the resin bath 63, the reinforced fiber yarns 52 and 53 are elongated by the drafting device 64. Thus, the reinforced fiber yarns 52 and 53 are smoothly elongated.

The present embodiment may be modified as follows.

Figure 10:
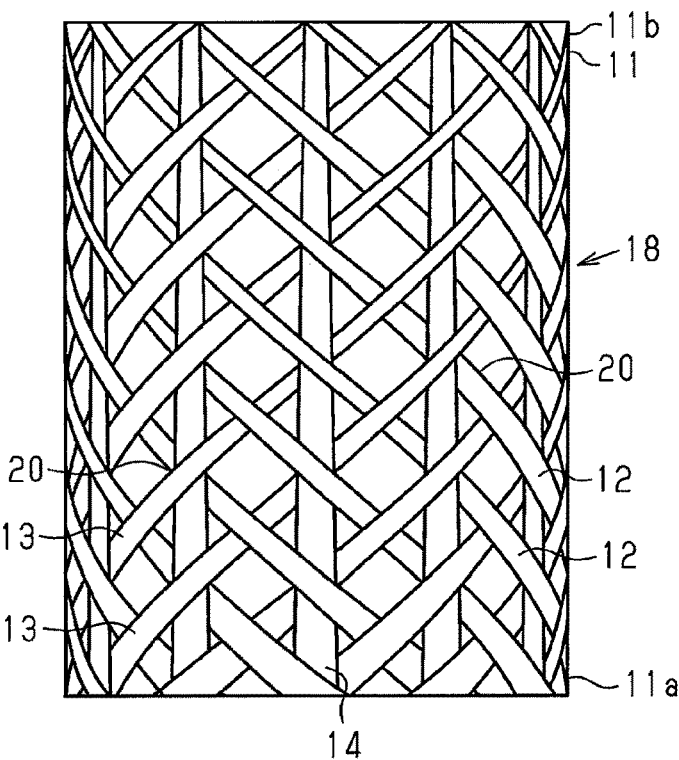
FIG. 10 is a front view of a further example of a tubular braid.

As shown in FIG. 10, the tubular braid 11 may be tubular and have a constant diameter in the axial direction.

Figure 11:
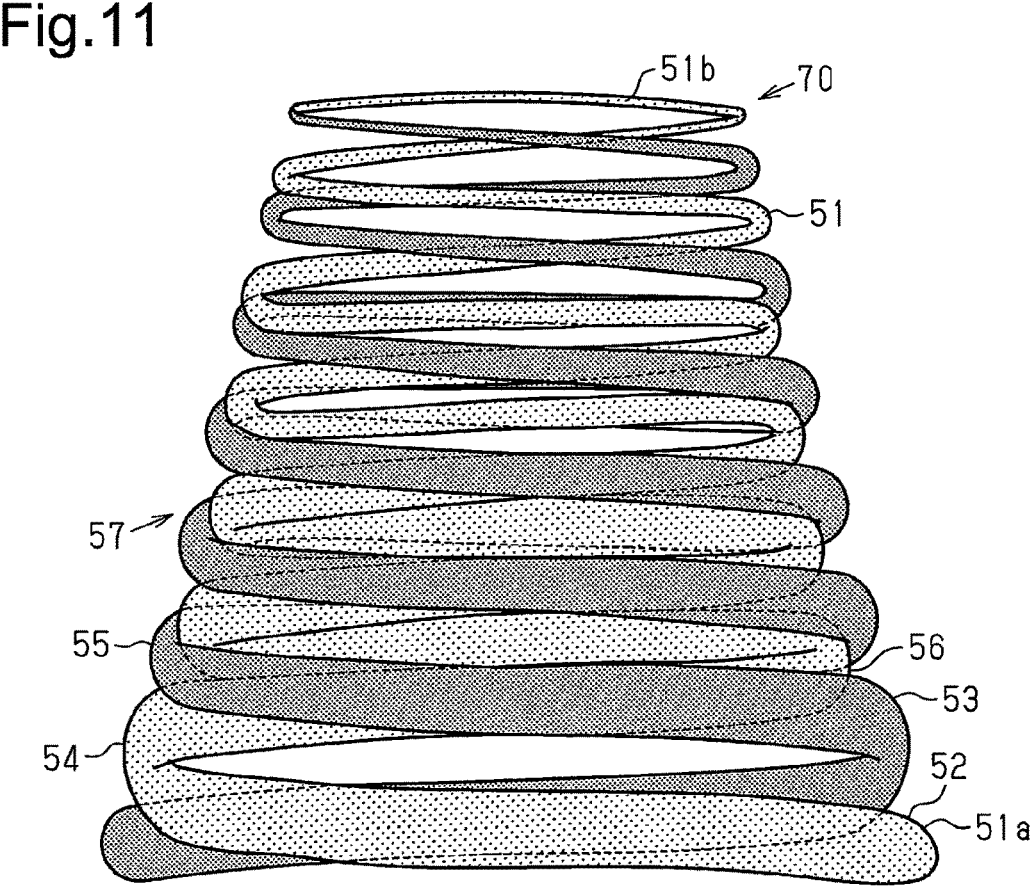
FIG. 11 is a front view of a further example of a fiber wound body.

As shown in FIG. 11, the fiber wound body 51 may be shaped as a tubular cone.

In the tubular braid 11 of the first embodiment, the first reinforced fiber yarns 12 and the second reinforced fiber yarns 13, or the oblique yarn lines, do not need to include the gradual cross-section change portions 20. More specifically, in the tubular braid 11, only the third reinforced fiber yarns 14, or the axial yarn lines, may include the gradual cross-section change portions 20. Alternatively, when at least one of the first reinforced fiber yarns 12 and the second reinforced fiber yarns 13, or the oblique yarn lines, includes the gradual cross-section change portions 20, and the third reinforced fiber yarns 14, or the axial yarn lines, do not have to include the gradual cross-section change portions 20. More specifically, reinforced fiber yarns including the gradual cross-section change portions 20 may be selected from the first to third reinforced fiber yarns 12 to 14 to control the thickness of the tubular braid 11.

In the second embodiment, the number of stacked fiber layers may be three or more.

The fiber-reinforced resin material using the tubular braid 11 and the fiber wound body 51 may be used as a structural material instead of a load energy absorbing material. Additionally, the tubular braid 11 and the fiber wound body 51 may be used in a fiber-reinforced compound including a matrix material other than a matrix resin.

In the drafting devices 40 and 64, the number of roller groups may be changed.

The fiber wound body may be manufactured in a solid structure, instead of a tubular structure, using a three-dimensional braider (three-dimensional braiding device).

The thickness of the tubular braid 11 or the fiber wound body 51 may be constant from the basal portions 11*a* and 51*a* toward the distal portions 11*b* and 51*b*.

The invention claimed is:

1. A fiber wound body comprising:
   reinforced fiber yarns wound about a winding axis, wherein
   each of the reinforced fiber yarns includes a gradual cross-section change portion, and
   the gradual cross-section change portion has a fiber content rate that is constant in a longitudinal direction of the yarn and has a cross section that gradually changes.

2. The fiber wound body according to claim 1, further comprising a gradual thickness change portion having a thickness that gradually changes along the winding axis, wherein
   the thickness is a dimension of the fiber wound body in a radial direction,
   the gradual thickness change portion has a thick part and a thin part, and
   the cross section of the gradual cross-section change portion regularly decreases from the thick part toward the thin part of the gradual thickness change portion.

3. The fiber wound body according to claim 1, wherein
   the reinforced fiber yarns include first reinforced fiber yarns, second reinforced fiber yarns, and third reinforced fiber yarns,
   the fiber wound body includes a braid,
   the first reinforced fiber yarns are arranged parallel to each other,
   the second reinforced fiber yarns are arranged parallel to each other and intersect with the first reinforced fiber yarns,
   the third reinforced fiber yarns are arranged parallel to each other and intersect with the first and second reinforced fiber yarns, and
   an angle at which the third reinforced fiber yarns intersect with the first reinforced fiber yarns is equal to an angle at which the third reinforced fiber yarns intersect with the second reinforced fiber yarns.

4. A fiber-reinforced resin material, comprising:
   the fiber wound body according to claim 1, the fiber wound body being a fiber-reinforced base; and
   a matrix resin.

5. A method for manufacturing a fiber wound body, the method comprising:
   elongating each of reinforced fiber yarns having a cross section constant in a longitudinal direction of the yarn in one direction with a drafting device including roller groups;
   when elongating the reinforced fiber yarns in one direction, forming a gradual cross-section change portion having a fiber content rate that is constant in the longitudinal direction of the yarn and having a cross section that gradually changes by continuously varying a drafting rate of the drafting device to continuously change the cross section of the reinforced fiber yarns in the one direction; and
   obtaining a fiber wound body by winding the reinforced fiber yarns including the gradual cross-section change portions about a winding axis.

* * * * *